(12) United States Patent
Stewart et al.

(10) Patent No.: US 8,869,524 B2
(45) Date of Patent: Oct. 28, 2014

(54) BALL AND SOCKET POWER CABLE CONNECTOR

(75) Inventors: David B. Stewart, Cranbury, NJ (US); William B. Powers, Exton, PA (US)

(73) Assignee: Ocean Power Technologies, Inc, Pennington, NJ (US)

( * ) Notice: Subject to any disclaimer, the term of this patent is extended or adjusted under 35 U.S.C. 154(b) by 146 days.

(21) Appl. No.: 13/431,775

(22) Filed: Mar. 27, 2012

(65) Prior Publication Data

US 2012/0247809 A1 Oct. 4, 2012

Related U.S. Application Data

(60) Provisional application No. 61/516,004, filed on Mar. 28, 2011, provisional application No. 61/516,003, filed on Mar. 28, 2011, provisional application No. 61/516,025, filed on Mar. 28, 2011.

(51) Int. Cl.
| | |
|---|---|
| *F03C 1/00* | (2006.01) |
| *F03B 13/10* | (2006.01) |
| *B63B 21/00* | (2006.01) |
| *F03B 13/20* | (2006.01) |
| *F03B 13/16* | (2006.01) |

(52) U.S. Cl.
CPC .......... *F03B 13/16* (2013.01); *F05B 2260/406* (2013.01); *Y02E 10/38* (2013.01); *F03B 13/20* (2013.01)

USPC ............ 60/504; 290/42; 290/53; 114/230.26; 114/230.2

(58) Field of Classification Search
CPC ......... Y02E 10/38; Y02E 10/20; Y02E 60/17; Y02E 10/28; Y02E 10/22; Y02E 10/32; Y02E 10/721; Y02E 10/725; Y02E 10/727
USPC ........... 60/497–504; 439/8, 6, 13; 290/42, 53; 114/230.1, 230.2, 293, 294, 230.26
See application file for complete search history.

(56) References Cited

U.S. PATENT DOCUMENTS

| | | | | |
|---|---|---|---|---|
| 4,469,392 | A * | 9/1984 | Edgerton et al. | 439/190 |
| 4,687,377 | A * | 8/1987 | Langner | 405/169 |
| 4,746,297 | A * | 5/1988 | Soleau | 439/8 |
| 5,018,980 | A * | 5/1991 | Robb | 439/8 |
| 2007/0193265 | A1 * | 8/2007 | Skotte et al. | 60/495 |
| 2009/0186538 | A1 * | 7/2009 | Wille et al. | 441/4 |

* cited by examiner

*Primary Examiner* — Hoang Nguyen
(74) *Attorney, Agent, or Firm* — Henry I. Schanzer

(57) ABSTRACT

Apparatus for connecting a power cable to a marine vessel which is subject to pitch, heave, roll and yaw motion includes a ball and socket device for decreasing the twisting and bending of the power cable. The socket is attached to the vessel and the ball can rotate freely Within the socket but its up down motion is restricted. The power cable's outer protective sheath is attached to the ball while its conductors pass through the ball and are connected to an internal connector. A flexible cable (wire) is connected between the internal connector and electrical equipment internal to the marine vessel.

16 Claims, 8 Drawing Sheets

BALL AND SOCKET POWER CABLE CONNECTOR

BACKGROUND OF THE INVENTION

This invention claims priority based on the following provisional applications whose teachings are incorporated herein by reference: (a) provisional application Ser. No. 61/516,004 filed Mar. 28, 2011 and titled PITCH DRIVEN WAVE ENERGY CONVERTER (PDWEC); (b) provisional application Ser. No. 61/516,003 filed Mar. 28, 2011 and titled MULTI-MODE WAVE ENERGY CONVERTER SYSTEM; and (c) provisional application Ser. No. 61/516,025 filed Mar. 28, 2011 and titled HYDRAULIC SPRING.

This invention relates to the connection of a (marine) cable carrying electric power and signals to a marine vessel, where the cable carries power and signals between the marine vessel and points external to the marine vessel.

The invention may be illustrated with reference to a wave energy converter (WEC) buoy, but it should be understood that it is applicable to any marine vessel. For example, wave energy conversion (WEC) systems or WEC buoys used to produce electric power need to connect to an underwater electrical power cable in order to export the power they produce to a power grid or other type of power distribution facility. Likewise, many types of marine applications require an electrical cable connection to a marine vessel. For example, boats or ships often need to connect to an electric power cable to receive electrical power for the powering of on-board equipment. Also, for example, many buoys (meteorological, oceanographic, etc.) have underwater sensors or equipment that need power transmitted to them and electrical signals received from them.

The point of connection of the underwater electrical cable to the marine vessel is often a point of stress to the underwater cable. In cases where the motion of the marine vessel is extreme (i.e. it heaves, pitches, rolls and/or yaws violently), the cable connection is a common point of failure. Numerous inventions and techniques exist to minimize the bending of cables at the point where the cable connects to the vessel (see U.S. Pat. Nos. 6,039,081, 7,695,197). Most of these concepts involve tapered sheaths around the cable and/or complex, articulated, interconnected bend limiting devices at the point of connection. These concepts still involve some flexing of the marine (or underwater) cable.

Known prior art bend restrictor devices and techniques, while effective at reducing the level of stress on cables, do not eliminate the cable flexures sufficiently and therefore do not eliminate the need for frequent servicing or replacement of the underwater cables, often at great expense.

SUMMARY OF THE INVENTION

In accordance with the invention the problem due to bending of (expensive and difficult to replace) marine cable is eliminated using a ball and socket device mounted to a side of a marine vessel (typically at or near its underside).

In accordance with one aspect of the invention, the ball and socket apparatus used to connect a power cable to a marine vessel minimizes the bending stress to which the cable is subjected even where the vessel moves in all directions and tends to cause the cable to twist and bend as it moves.

The power cable typically includes an outer protective sheath and an inner core containing conducting wires for connection to selected components located within and internal to the marine vessel. The connecting apparatus includes a ball and a socket with the socket being formed within a side of the marine vessel and shaped to holding the ball so the ball can rotate generally freely within the socket while its up and down movement is restrained. The outer protective and mechanical load bearing sheath of the power cable is securely attached to the ball while the conducting wires within the inner core pass through the ball and get connected to an internal connector. Flexible wire connections are made between the conducting wires at the internal connector and preselected point(s) within the marine vessel. The use of the ball and socket device moves the point of articulation to a flexible cable which is of generally simple construction and can be replaced more readily and economically.

In an embodiment of the invention, a cylindrical pipe or conduit extends from the underside of a spherical ball through its center and ends above the top side of the ball. The pipe is securely and permanently attached to the ball. The spherical ball is "captured" by a "socket" located on or near the underside of a marine vessel which allows the ball to rotate over a wide range of pivot angles (e.g. plus or minus 45 degrees) and yaw angles (365 degrees). A marine cable having an outer protective layer and an inner core carrying conductors extends through the pipe/conduit. The outer protective layer is firmly and securely attached to the pipe and hence to the ball at a point about the top side of the ball. This removes mechanical stress on the inner core carrying conductors. The conductors within the marine cable can be terminated at an internal connector in a waterproof junction box above the ball. A flexible cable which can be replaced easily and economically and which can tolerate twisting and turning is connected to the internal connector. The replaceable cable is generally less expensive than known underwater marine cable and can undergo twisting and turning because it does not require strength members and armoring commonly required for marine cables: A bend restrictor may be connected around the marine cable about the underside of the ball to reduce flexure of the marine cable at the hull.

BRIEF DESCRIPTION OF THE DRAWINGS

In the accompanying drawings which are not drawn to scale like reference characters denote like components.

DETAILED DESCRIPTION OF THE DRAWINGS

Figure 1:
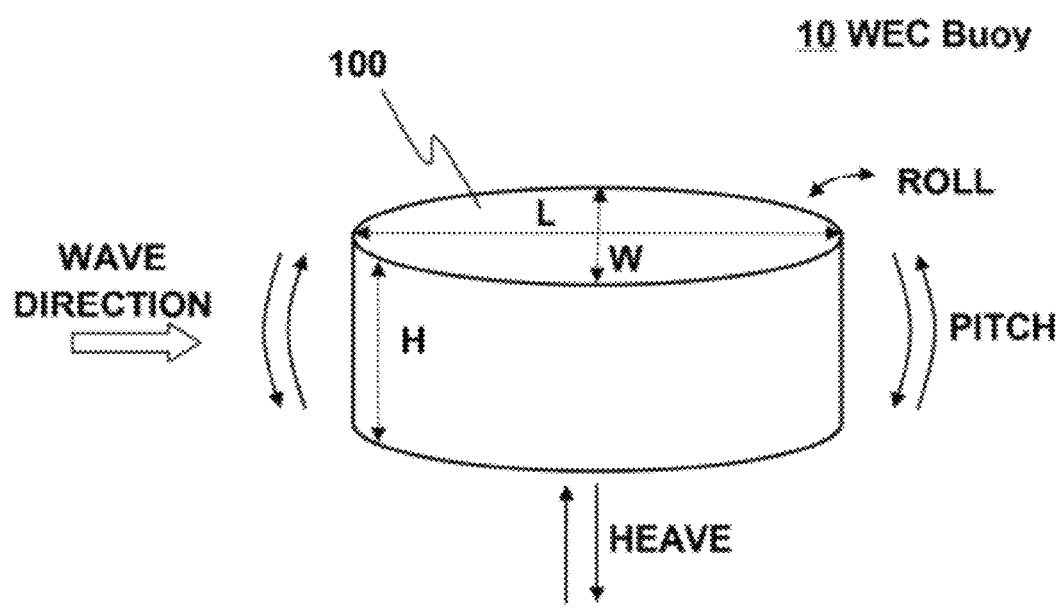
FIG. 1 is a highly simplified isometric drawing showing the hull of a marine vessel (a cylindrical buoy, in this case) which may be used to practice the invention.

Referring to FIG. 1 there is shown a highly simplified isometric drawing of a cylindrical Wave energy converter (WEC) buoy 10 including a container 100 which may be used to practice the invention. The container 100 may have any suitable shape and may also be referred to as a marine vessel, hull, shell or can.

Figure 2:
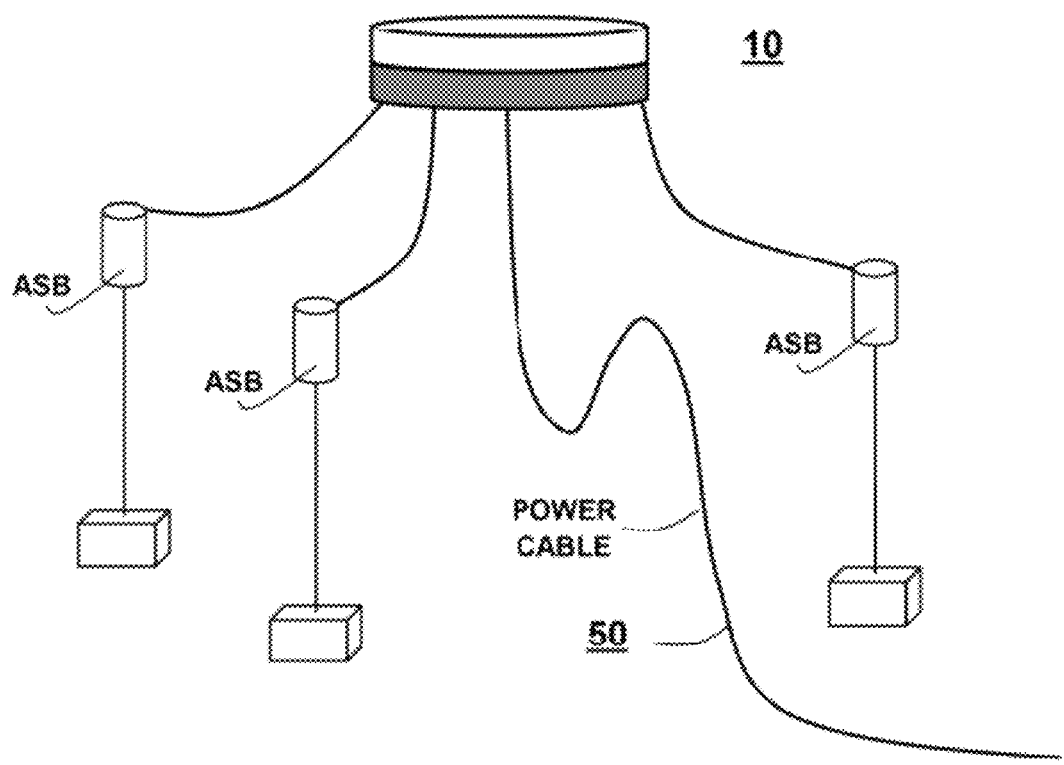
FIG. 2 is a highly simplified diagram showing a mooring arrangement for a wave energy conversion (WEC) buoy and an electrical power cable attached to and extending from the bottom of the buoy.

FIG. 2 is a highly simplified diagram showing a mooring arrangement for a wave energy conversion (WEC) buoy 10 and an electrical power cable 50 attached to and extending from the bottom of the buoy. The WEC buoy 10 produces electric power in response to wave motion and the cable 50 is used to transmit electric power generated by (or in) the WEC buoy to a land-based power grid directly or via a suitable substation or other interconnections. The mooring arrangement shown allows the WEC buoy 10 to move in all directions (i.e., pitch back and forth, heave or roll and/or yaw).

Figure 2A:
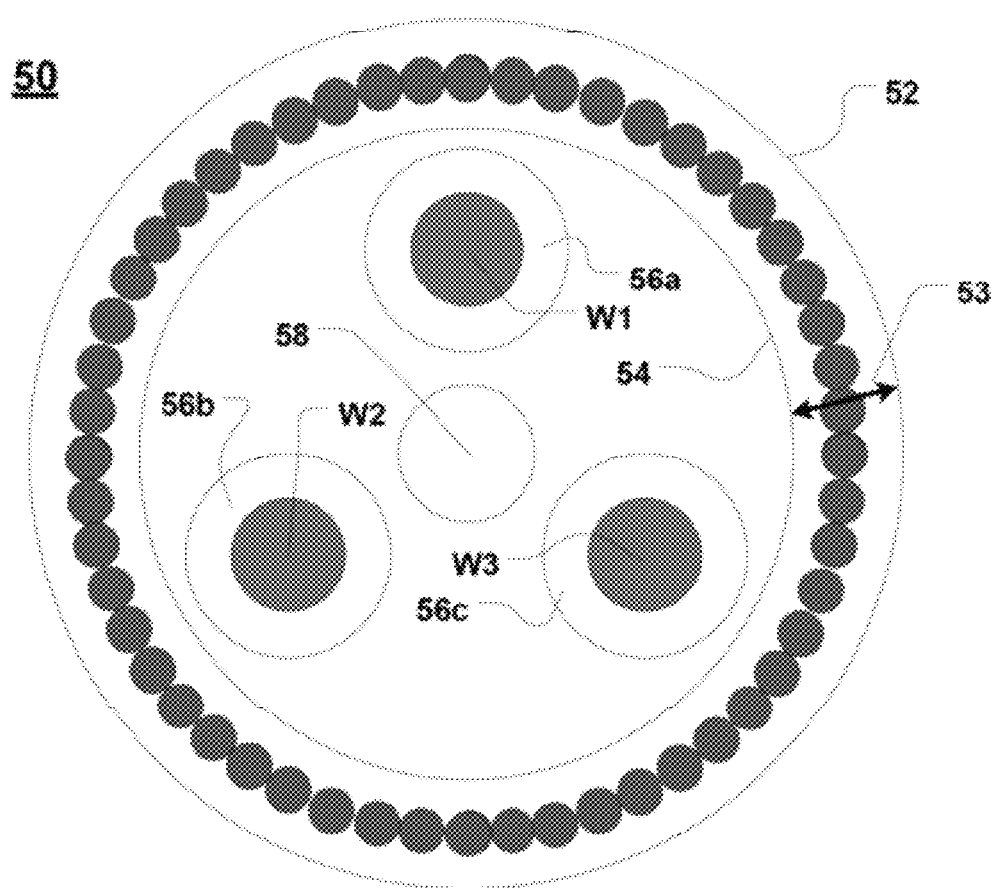
FIG. 2A is a highly simplified cross sectional diagram of a power cable for use in practicing the invention.

FIG. 2A is a highly simplified cross sectional diagram of a power cable 50 which may be used to practice the invention. The cable includes an outer layer 52 and an inner core layer 54. A protective sheath 53 (which may be a metalized armor layer) is formed between layers 52 and 54. Within the inner core 54 there are conductive (e.g., of copper) wires (e.g., W1 W2, W3) each wire having its own insulation in addition to a common insulation between the various wires. These conductive wires may be power conductors or signal lines. In addition there may be bundles of signal carrying wires 58 (e.g., an optic fiber bundle) that extend within and along the inner core.

The outer layer 52 and the sheath 53 of marine electrical cables typically contain steel, synthetic, or composite "strength" members to handle the mechanical load of the cable. In addition, many marine cables add "armoring" to protect the electrical portion of the cable from chafing and other marine hazards (e.g. fish bite). In general, conventionally available electrical cables with copper conductors and insulating materials are not designed to handle mechanical loads seen by marine cables.

As shown in the figures, where the WEC buoy generates power in response to the motion of the waves, the cable 50 functions as the means to transfer (via conduction) electrical power and/or signals between the WEC buoy electric equipment and an on-shore power grid or some other point or source.

Figure 3:
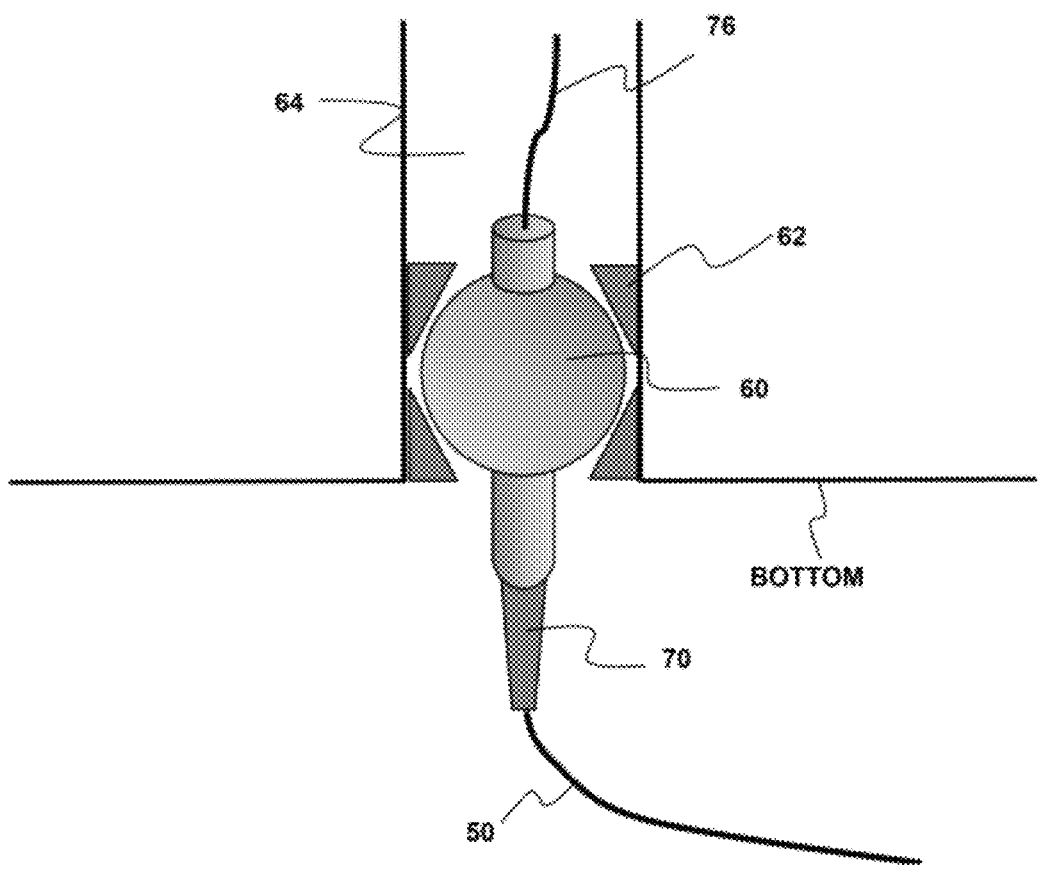
FIG. 3 is an isometric diagram of a ball and socket connection embodying the invention mounted on the underside of a marine vessel.

FIG. 3 is a highly simplified isometric diagram of a ball 60 and socket 62 connection embodying the invention. The ball 60 is mounted within a socket 62 firmly and securely (if not permanently) attached to a conduit 64 centered within the marine vessel or WEC buoy 10. The socket 62 is shaped to allow the ball to rotate generally freely (e.g., 360 degrees) and to move to the right and left or front and back (e.g., plus or minus 45 degrees). The ball 60 (and the socket 62) may be made of steel or any other durable and suitable metal or material. It will rub against the socket, so it needs to be durable.

The marine cable 50 is mechanically attached to the ball by securely attaching the outer layer 52 and the protective sheath 53 of the cable to the ball using clamps or other mechanical attachment techniques. The electrical conductors (e.g., W1, W2, W3), within the cable 50, along with their insulating sheaths, are passed through to the top of the ball or to a pipe extending from the top of the ball. The electrical conductors (e.g., W1, W2, and W3) are terminated in a junction box (which may be waterproof) at the top of the ball or at the top of the pipe connected to the ball. A flexible cable 76 which is designed to twist and bend easily (and which may be replaceable) is connected to the conductors of the marine cable. Note the top side of the ball may be located within a conduit 64 which runs through the center of the buoy and which may be made waterproof.

The portion of the power cable attached to the bottom side of the ball 60 includes a bend restrictor 70 to stiffen the cable at that point. The bend restrictor 70 surrounds the portion of the marine cable 50 attached to the ball 60 so as to spread out the stress imposed on the marine cable. The bend restrictor eliminates an acute point of contact of the cable with the ball.

In FIG. 3, the hull of the marine vessel is shown to have a hole cut-out in the bottom of the vessel. This "hole" contains "socket" 62 which may be formed of one or more sections (pads), which may be of metal or composite material, to fit around the generally spherical ball 60. Socket 62 is formed to fit about the ball 50 so the ball can move back and forth (possibly up to 45 degrees) and rotate freely (360 degrees) in any and all directions. However, the socket is also shaped to prevent the ball from moving up or down. The socket is strong enough to handle the downward and lateral pull of the cable in all conditions. It is assumed the marine vessel will have a mooring or other constraining device that keeps the marine cable from acting as the vessel's mooring. However, in the case of a buoy, it might be possible to use the cable as the mooring. The socket may be made of metal or it may be made of one of the composite marine bearing materials that are commercially available.

Figure 3A:
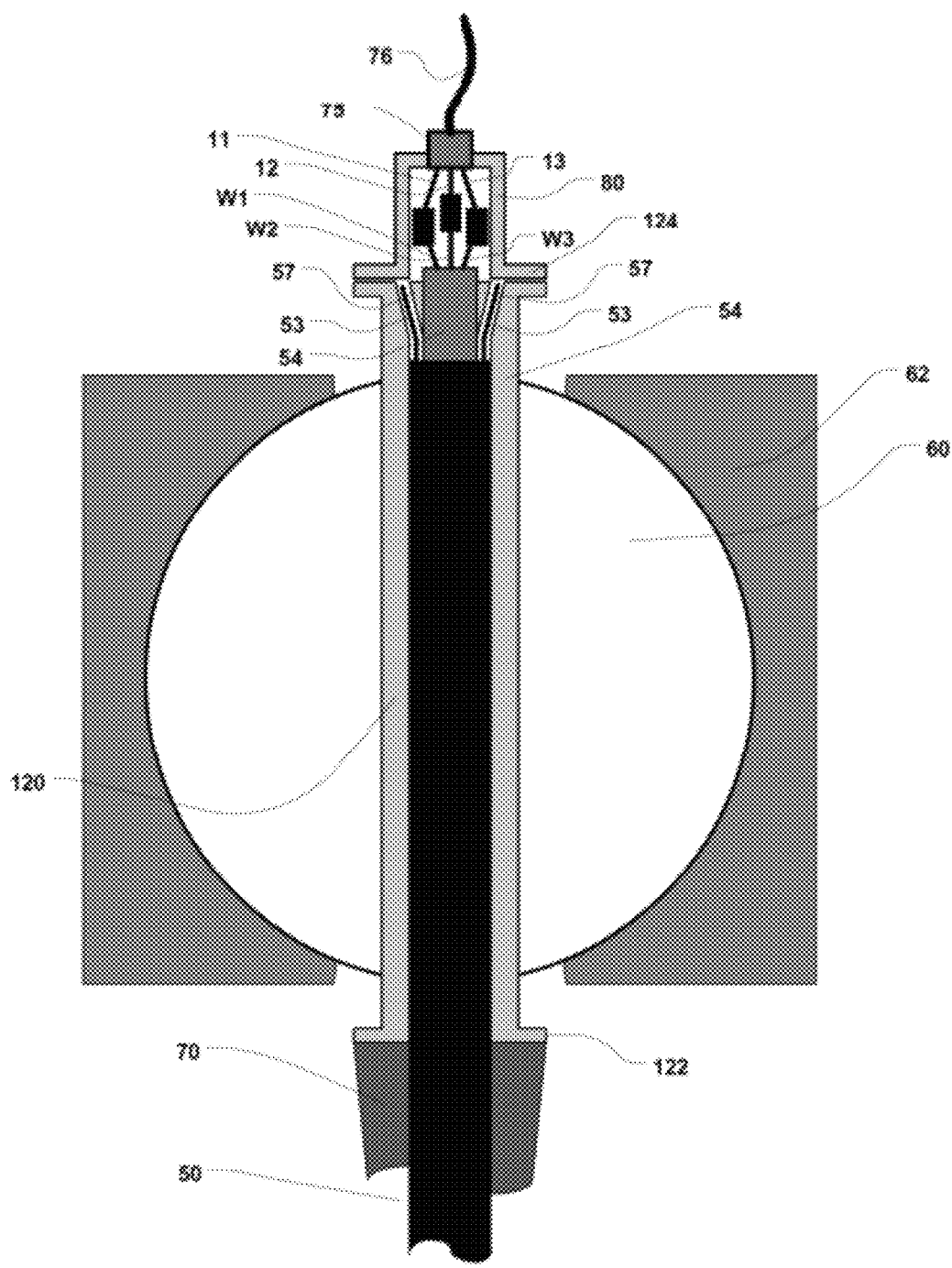
FIG. 3A is a highly simplified cross sectional diagram showing the connection of the cable to the ball and connection of the conductive wires to a connector in accordance with the invention.

Referring to FIG. 3A, note that there is a pipe 120 which extends through the center of the ball 60. The pipe is firmly and securely attached to the ball (e.g., it may be welded or mechanically coupled). The pipe may have a bottom flange 122 to which is attached a cable bend restrictor/limiter 70 and an upper flange 124. The marine cable 50 is passed through the pipe 120 extending from the bottom of the pipe (underneath the ball) and extending above flange 124. The outer layer and outer sheath or armor, 53, of the cable 50 are mechanically and securely attached to the pipe 120 which is attached to ball 60. Wedges 57 or other clamping means are used to secure the armor, strength members and/or outer sheath to the pipe/ball. The conductors (e.g., W1, W2, W3) of the power cable extending above the pipe/ball may be connected directly (or via separate electric connectors) to an internal connector 75. Flexible wires (e.g., 11, 12, and 13) may then be connected (individually or via a common flexible cable 76) from the connector 75 to terminals (e.g., 77 shown in FIGS. 4A, 4B and 4C) which are in turn connected to selected portion(s) of electric equipment 102. It should be appreciated that the flexible wires (or cables) may twist, turn and bend without significant stress or damage to these wires (or cables) and/or their connections. It should also be noted that the flexible wires (or cables) may be made replaceable in situ. It should also be noted that the ball, socket and replaceable flexible cable are contained in a housing that can be lifted on top of the buoy or a service boat for the purpose of cable replacement or repair. Regarding the invention and as illustrated herein, the marine cable 50 is pulled up into a pipe 120 or a conduit within the ball 60. The cable armor or strength members (52, 53) can be separated from the cable core 54 above the top side of the ball 60 and can be mechanically secured to the ball (or the pipe 120 attached to the ball) using one of many means of clamping device. With the cable armor or strength members secured to the ball, the marine cable core 54 does not carry substantial mechanical load. The marine cable connection to the underside of the ball 60 can be made waterproof by the bend restrictor or with other means below or inside the ball. The core portion 54 of the marine cable being separated from the outer layer of cable 50 above the topside of the ball continues upward to a waterproof junction box 80. In junction box 80 (or an equivalent structure) the conductors extending within the core 54 of the cable 60 (e.g., copper and/or optical fiber conductors) are connected to corresponding conductors present in flexible cable 76. The flexible cable 76 (and or individual conductors) continues upward from the waterproof connector or junction box through the ball and socket enclosure conduit to predetermined contact points.

Figure 4A:
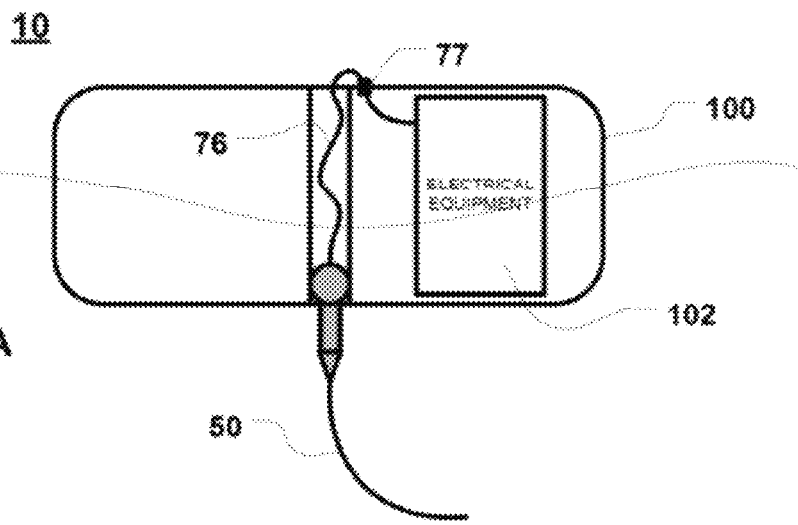
FIGS. 4A, 4B, and 4C are highly simplified cross-sectional drawing showing motion of a ball the power cable and flexible conductors in accordance with the invention.
Figure 4B:
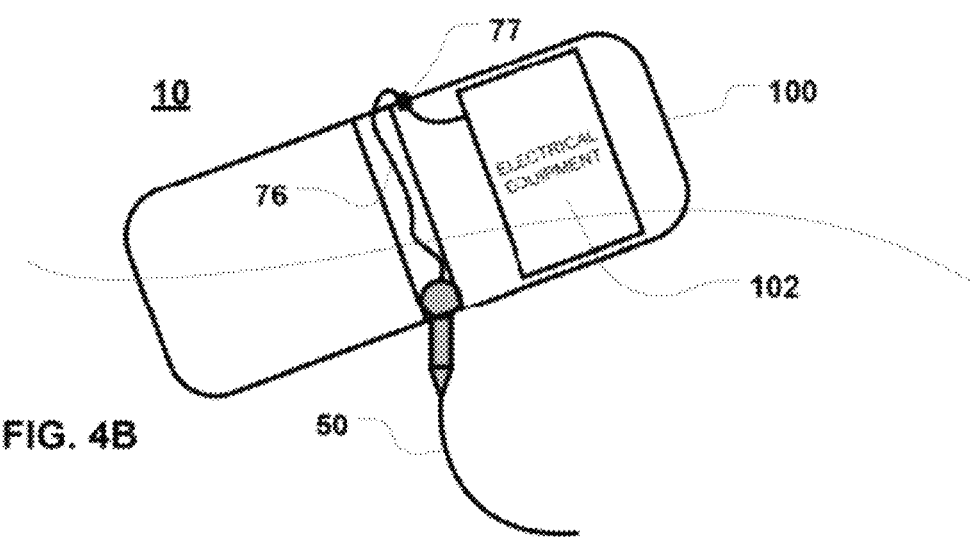
Figure 4C:
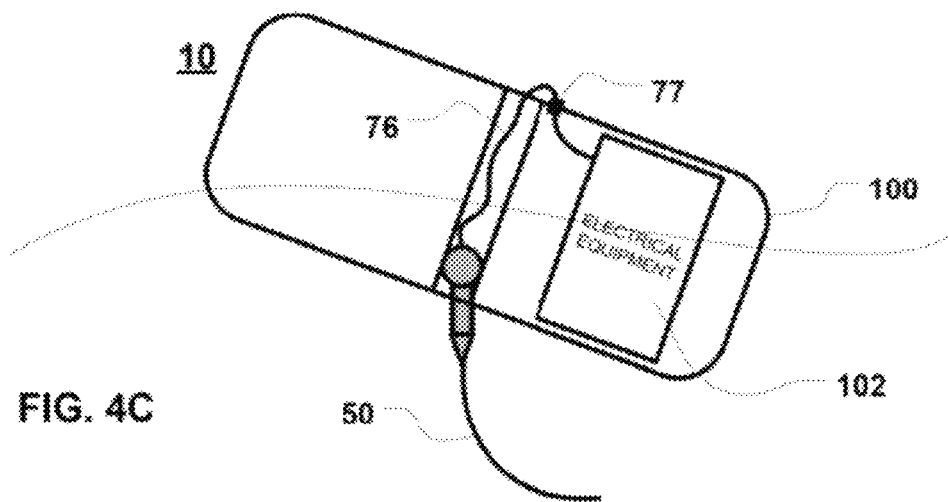

FIGS. 4A, 4B, and 4C are highly simplified cross-sectional drawing showing motion of a ball 60 and of the power cable 50 and a flexible cable 76 containing for example, wires 11, 12, 13, corresponding to W1, W2, W3 in accordance with the invention. In these figures the shell 100 is shown subjected to sharp pitching motion of the waves. The WEC buoy, because of its pitching, will apply stress to the power cable 50 exiting the bottom of the buoy. The use of the ball and socket connection minimizes this stress and eliminates a potential weakness of pitch-driven WEC buoys.

Figure 5:
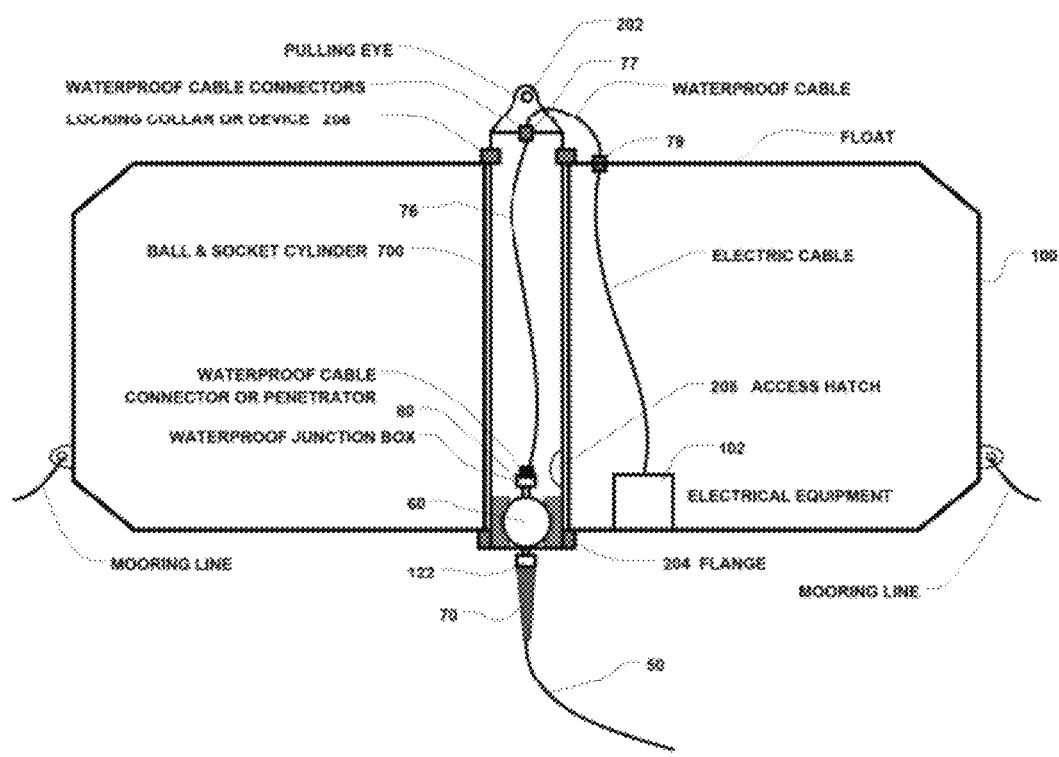
FIG. 5 is a detailed cross sectional view of a WEC buoy employing a ball and socket in accordance with the invention.
Figure 6:
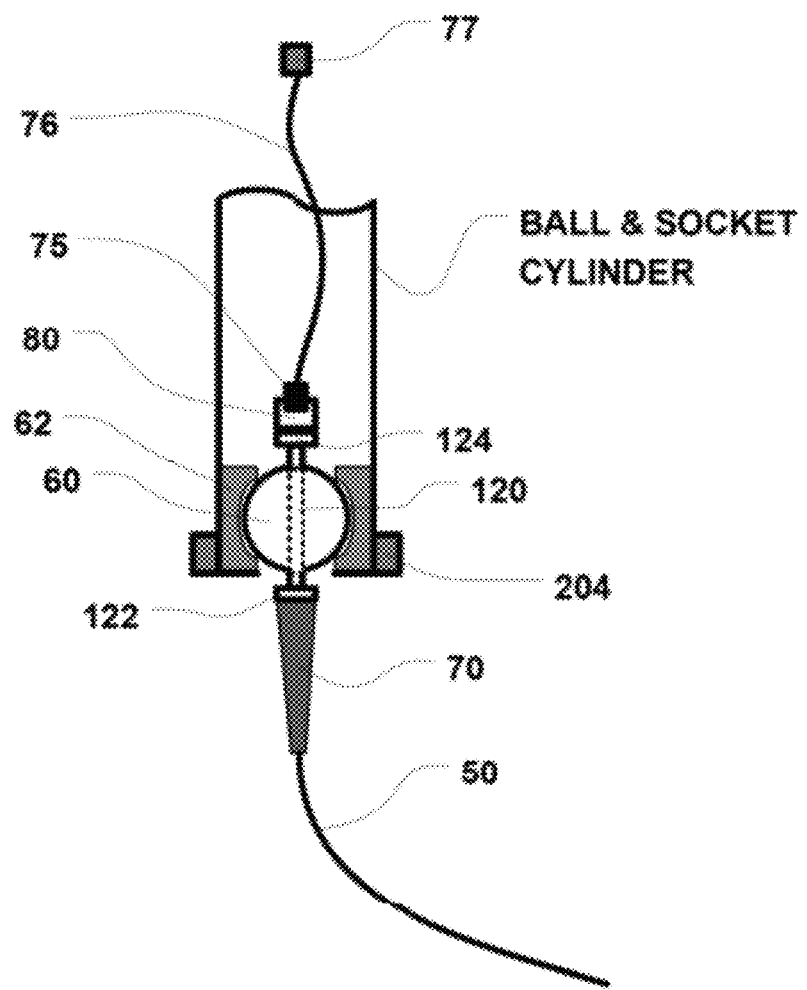
FIG. 6 is also a cross section view of a ball and socket connection embodying the invention.

As shown in FIGS. 5 and 6, a waterproof junction box 80 may be located on top or above the ball 60. The junction box 80 may be located at the top of the ball or on a pipe attached to the top of the ball. The junction box 80 enables for the connection of the marina cable electrical conductors (e.g., W1, W2, W3) to the conductors of the flexible cable 76 that is a part of the marine vessel (WEC buoy). The junction box is preferably made to be waterproof, because it will be occasionally submerged. The junction box and the electrical penetrations are sealed such that water does not flow into the interior of the marine and flexible cables. The flexible cable 76 may be connected to the junction box with waterproof connectors or with "gland" type penetrators.

A flexible cable 76 can be used to carry electrical power and/or signals from the junction box 80 to another junction connector or point (e.g., 77) located above it in the vessel 100 (see FIGS. 4A-4C). The upper connection point, 77, (it could be another junction box, an electrical connector or electrical penetrator) may be used to make electrical connection with on-board electrical equipment. In the case of energy conversion systems, electrical power is carried through this connection. The flexible cable will undergo many flexing cycles as the marine vessel moves about its axes of motion. This cable may have to be replaced periodically. The flexible cable 76, because it does not need the same level of mechanical strength and armoring (protection) as the marine cable 50, is significantly less expensive to replace than the marine cable.

As shown in the figures, the ball and socket components are mounted at the bottom of a conduit 64 that extends from the bottom of the marine vessel to the top or other above-water location in the vessel (e.g. a higher-level deck). Marine service personnel can access the terminal box and flexible cable via this conduit for servicing of the flexible cable.

FIG. 5 shows one embodiment of the invention, where the ball, socket, junction box 80 and flexible cable 76 are part of a system that can be installed or removed as a single unit. The ball, socket, junction box, flexible cable and connectors are contained in a cylindrical chamber 200. In accordance with this approach, the ball and socket cylindrical chamber 200 and its contents can be pre-assembled before being installed into the shell 100. The cylindrical chamber 200 has a lifting eye 202 which allows a mechanical cable to be used to pull the cylindrical chamber 200 up through the conduit (e.g., 64) in the shell. In the event of a failure (due to failure of cable 76 or any other item), the cylindrical chamber 200 can be hoisted (raised or possibly lowered) through the conduit and placed on a surface (e.g., deck of a service boat) where the failure (e.g., failed cable) can be repaired or replaced.

This approach may be preferable to a ball and socket combination that is permanently located at the bottom of the shell, where access is limited. The cylindrical chamber 200 can have a flange 204 at the bottom that can be pulled up tight against the bottom of the marine vessel hull. A "locking collar" 206 can clamp the cylindrical chamber 200 at the top to keep it from falling down. The cylindrical chamber 200 can also include an "access hatch" 208 that provides a means of access to get to the flexible cable 76 and the junction box 80. The shape of the cylindrical chamber 200 can also be tapered, with a large cross-section near the ball to allow ample room for flexing of cable 76. Such an approach can keep the size and weight of the ball and socket pipe assembly to a reasonable size.

FIG. 6 is a close-up view of a ball 60 and socket 62 within the ball and socket cylinder. It may be advantageous to have a relatively short pipe 120 with a flange 122 extending, perpendicularly to the pipe, below the ball. The flange 122 can facilitate the connection of the bend restrictor 70. That is, the flange can provide a connection point for bolts or other fasteners that secure the bend restrictor to the pipe and ball. The pipe 120 being of relatively small diameter, can allow a wide angle of rotation of the ball. It may also be advantageous to have a short pipe 120 with a flange 124 extending, perpendicularly to the pipe, above the ball. The flange can provide a connection point for a cable junction box 80 in which is mounted internal connector 75. The pipe 120, being of relatively small diameter, can allow a wide angle of rotation of the ball.

What is claimed is:

1. Apparatus for connecting a power cable to a marine vessel, where the vessel is capable of moving in all directions, and where the power cable includes an outer protective layer and an inner core containing conducting wires for connection to selected components located within the marine vessel, the apparatus comprising:
   a ball and a socket;
   said socket being mounted within said marine vessel for holding said ball; said socket shaped to allow the ball to rotate and move around the socket while restraining any up and down movement of the ball;
   means for securely attaching the outer protective layer of the power cable to said ball while allowing the inner core and all the conducting wires to pass through said ball and all the conducting wires being electrically insulated from said ball;
   means connecting the conducting wires of the inner core to an internal connector; and
   flexible wire connections connected between the conducting wires at the internal connector and preselected points within the marine vessel.

2. Apparatus as claimed in claim 1, wherein the flexible wire connections connected between the conducting wires at the internal connector and preselected point within the marine vessel are contained within a flexible cable.

3. Apparatus as claimed in claim 1, wherein the marine vessel has an underside and wherein the socket is located at or near the underside of the marine vessel.

4. Apparatus as claimed in claim 1, wherein the marine vessel is a wave energy converter (WEC) buoy which includes wave energy converting equipment for producing electrical power to be distributed via said power cable.

5. Apparatus as claimed in claim 1, wherein said means for securely attaching the outer protective layer of the power cable to said ball while allowing the inner core to pass through said ball includes a conduit extending from the underside of the ball the top side of the ball, wherein the conduit is firmly and securely attached to the ball, and wherein said marine cable extends through the conduit and said outer protective layer is attached to the conduit and via the conduit to the ball.

6. Apparatus as claimed in claim 5, wherein said conduit is a pipe having a bottom end extending below the ball and having a top end extending above the ball, the pipe having a bottom flange connected to its bottom end extending in a generally perpendicular direction to the pipe and having a top flange connected to its top end extending in a generally perpendicular direction to the pipe.

7. Apparatus as claimed in claim 6, wherein means for securely attaching the outer protective layer of the power cable to said ball and said means connecting the conducting wires of the inner core to an internal connector are located in a waterproof junction box located above the top flange.

8. Apparatus as claimed in claim 1, wherein said ball has an underside generally in, or close, to the water and an upper side, opposite said lower side, and wherein a bend restrictor is attached around the power cable at or near its passage into the underside of the ball.

9. Apparatus as claimed in claim 1, wherein said means connecting the conducting wires of the inner core to an internal connector includes a waterproof enclosure for keeping the conducting wires of the inner core and the internal connector and the flexible wire connections free of water.

10. Apparatus as claimed in claim 1, wherein said marine vessel has a top side and a bottom side and includes a conduit located centrally along said bottom side and said conduit extending from the bottom side toward the top side and wherein said socket is located in said conduit near the bottom side of the marine vessel.

11. Apparatus as claimed in claim 1, wherein said marine vessel has a top side and a bottom side and includes a space centrally located along the horizontal plane of said marine vessel and said space extending from the bottom side to the top side and wherein a chamber is located within said space, said chamber containing said socket and ball and the top end of said power cable and said internal connector and said flexible wire connections.

12. Apparatus as claimed in claim 1, wherein said ball is generally spherical and is made of durable material.

13. Apparatus as claimed in claim 1, wherein said ball has an underside located at or close to the water and an upper side generally opposite its underside; and wherein the power cable passes through the center of the ball; and wherein the outer protective layer of the power cable ball is attached to the upper side of the ball.

14. Apparatus for connecting a power cable to a wave energy converter (WEC) buoy which includes wave energy converting equipment for producing electrical power to be distributed via said power cable; where the power cable includes an outer protective layer and an inner core containing conducting wires for connection to selected components located within the WEC buoy, the apparatus comprising:
 a ball and a socket;
 said socket being mounted within said WEC buoy for holding said ball; said socket shaped to allow the ball to rotate and move around the socket while restraining any up and down movement of the ball;
 means for securely attaching the outer protective layer of the power cable to said ball while allowing the inner core and all the conducting wires to pass through said ball, with all the conducting wires being electrically insulated from said ball;
 means connecting the conducting wires of the inner core to an internal connector; and
 flexible wire connections connected between the conducting wires at the internal connector and preselected points within the WEC.

15. Apparatus as claimed in claim 14, wherein said ball has an upper side facing interiorly to the WEC buoy and a bottom side facing exteriorly to the WEC buoy, and wherein the means attaching the outer protective layer includes attaching the outer protective layer to the top side of the ball.

16. Apparatus as claimed in claim 14, wherein said means for securely attaching the outer protective layer of the power cable to said ball while allowing the inner core to pass through said ball includes a pipe having a bottom end extending below the ball and having a top end extending above the ball, the pipe having a bottom flange connected to its bottom end extending in a generally perpendicular direction to the pipe and having a top flange connected to its top end extending in a generally perpendicular direction to the pipe.

* * * * *